United States Patent [19]

Yardley et al.

[11] 4,076,891

[45] Feb. 28, 1978

[54] PRODUCT AND METHOD OF MOLDING PLASTIC-RUBBER COMPOSITES

[75] Inventors: James Frank Yardley, Shenston, near Lichfield; Allen Frederick Nightingale, Birmingham, both of England

[73] Assignee: Dunlop Limited, London, England

[21] Appl. No.: 550,001

[22] Filed: Feb. 14, 1975

Related U.S. Application Data

[63] Continuation of Ser. No. 303,050, Nov. 2, 1972, abandoned.

[30] Foreign Application Priority Data

Nov. 18, 1971 United Kingdom ............... 53556/71
Sep. 20, 1972 United Kingdom ............... 43525/72

[51] Int. Cl.$^2$ .......................... B32B 25/08; B29H 9/00
[52] U.S. Cl. ..................... 428/517; 264/259; 264/279; 264/328; 264/329; 428/519; 428/521; 428/523
[58] Field of Search ............... 264/255, 265, 266, 267, 264/259, 244, DIG. 42, DIG. 59, DIG. 74, 279, 328, 329; 428/517, 519, 521, 523

[56] References Cited

U.S. PATENT DOCUMENTS

| 2,230,879 | 2/1941 | Bronson | 264/275 |
|---|---|---|---|
| 2,744,290 | 5/1956 | Corson | 264/326 |
| 3,296,061 | 1/1967 | Tavenor et al. | 428/448 |
| 3,406,732 | 10/1968 | Milano et al. | 152/330 |
| 3,445,318 | 5/1969 | Bramb et al. | 428/517 |
| 3,506,527 | 4/1970 | Wilder et al. | 156/110 |
| 3,660,224 | 5/1972 | Cau et al. | 428/517 |
| 3,758,643 | 9/1973 | Fischer | 260/897 A |

FOREIGN PATENT DOCUMENTS

| 48-4958 | 2/1973 | Japan. |
|---|---|---|
| 1,320,244 | 6/1973 | United Kingdom. |

*Primary Examiner*—James B. Lowe
*Attorney, Agent, or Firm*—Stevens, Davis, Miller & Mosher

[57] ABSTRACT

A method of producing a molded plastic-rubber composite comprising injection or transfer molding a substantially linear crystalline low pressure solution olefin polymer so that it is brought, in a molten state, into contact with a prevulcanized rubber component containing up to 70 per cent by volume of a rubbery olefin polymer.

The plastic-rubber composite produced by this method may be used in applications in which hitherto rubber-metal composites have been used, for example valve diaphragms, tire valve bodies, shock absorbers, engine mountings, vibration dampers, compression springs, torsion bushes, flexible drive couplings etc., of which the following is a specification.

6 Claims, No Drawings

PRODUCT AND METHOD OF MOLDING PLASTIC-RUBBER COMPOSITES

This is a continuation, of application Ser. No. 303,030, filed 11-2-72, now abandoned.

This invention relates to moulded plastic-rubber composites and in particular polyolefin plastic-rubber composites moulded by injection or transfer techniques.

According to one aspect of the invention a moulded composite structure comprises at least one component made of a substantially linear crystalline low pressure solution olefin polymer fusion-bonded to at least one component made of a prevulcanized rubber composition containing up to 70 percent by volume of a rubbery olefin polymer.

According to another aspect of the invention, a method of producing a moulded plastic-rubber composite comprises injection or transfer-moulding a substantially linear crystalline low pressure solution olefin polymer so that it is brought, in a molten state, into contact with a prevulcanized rubber component containing up to 70 percent by volume of a rubbery olefin polymer.

While adequate bonding is achieved using rubber compositions containing up to 70 percent by volume of a rubbery olefin polymer is is preferred to use rubber compositions containing from 5 to 55 by volume percent of a rubbery olefin polymer.

The rubbery olefin polymer may be saturated or unsaturated; rubbers that may be used include ethylene/propylene copolymer, containing from 20 to 85 mole percent ethylene or ethylene/alpha-olefin/polyene terpolymers, containing from 20 to 85 mole percent ethylene and from 0.1 to 10 mole percent units derived from the polyene.

The main ingredients of the rubber composition in addition to the rubbery olefin polymer are one or more fillers and/or extending oils. These may be selected from any of those normally used in compounding olefin polymers. Other additives such as vulcanizing ingredients, pigments, etc. may also be included.

The substantially linear crystalline low pressure solution olefin polymers are preferably polymers of ethylene or propylene and include high density ethylene homopolymers, polypropylene or copolymers of ethylene and/or propylene with minor amounts of one or more other olefin monomers, for example butene-1, hexene-1, or with minor amounts of diene monomers, i.e. butadiene.

The substantially linear crystalline low pressure solution olefin polymers have melt indices or minimum flow rates of not less than 0.25. These melt indices or minimum flow rates are determined under test conditions specified in ASTM standard D 1238-65T.

The plastic compositions may contain any of the additives (i.e. fillers, reinforcing agents, etc.) normally added to such materials.

This invention may be used in the manufacture of many articles which hitherto have been made as metal/rubber composites, for example valve diaphragms which have a rubber body with a plastic insert, tyre valve bodies, shock absorbers, engine mountings, vibration dampers, compression springs, torsion bushes, flexible drive couplings, etc.

The invention will now be illustrated by the following Examples:

EXAMPLE I

Rubber compositions A, B and C of the formulations given in Table I were vulcanized for 60 mins at 150° C in a mould measuring 8.0 mm × 76.2 mm × 228.6 mm. Slabs 50.8 mm square and 8.0 mm thick were cut from the sheets of each sample and were placed in turn in a mould measuring 12.7 mm × 50.8 mm × 50.8 mm. Polypropylene (commercially available as Shell Carlona KM 61) was injected into the mould from an injection-moulding machine and maintained for 15 seconds at a pressure of 94 MN/m$^2$.

The mould and nozzle of the injector were respectively at 60° C and 300° C at the commencement of the injection cycle. The composite was allowed to cool for 75 seconds.

The bond of each rubber sample to the polypropylene was assessed by stripping the rubber vulcanizate from the polypropylene and measuring the area of the polypropylene to which the vulcanizate had strongly adhered. These results are shown in Table I:

TABLE I

|  | A | B | C |
|---|---|---|---|
| EPDM (ROYALENE 502) | 100 | 100 | 100 |
| ISAF (intermediate super abrasion furnace) carbon black | 35 | 35 | 65 |
| naphthenic oil | 4 | 36 | 56 |
| zinc oxide | 5 | 5 | 5 |
| sulphur | 2 | 2 | 2 |
| mercaptobenzthiazole | 1.5 | 1.5 | 1.5 |
| tetramethylthiuram disulphide | 0.75 | 0.75 | 0.75 |
| tellurium diethyl dithiocarbamate | 0.75 | 0.75 | 0.75 |
| dipentamethylene thiuram tetrasulphide | 0.75 | 0.75 | 0.75 |
| % by volume of olefin polymer | 80.4 | 58.2 | 53.7 |
| adhesion to polypropylene (%) | None | 80 | 100 |

Note: all values are parts by weight unless stated otherwise.

EXAMPLE II

Example I was repeated using the formulation given in Table II:

TABLE II

|  | D |
|---|---|
| EPDM (ROYALENE 502) | 100 |
| Speswhite clay | 150 |
| naphthenic oil | 50 |
| zinc oxide | 5 |
| sulphur | 2 |
| mercaptobenzthiazole | 1.5 |
| tetramethyl thiuram disulphide | 0.75 |
| tellurium diethyl dithiocarbamate | 0.75 |
| dipentamethylene thiuram tetrasulphide | 0.75 |
| % volume of olefin polymer | 49.6 |
| adhesion to polypropylene (%) | 100 rubber failure on stripping |

Note: all values are parts by weight unless stated otherwise.

EXAMPLE III

Example I was repeated using formulations E and F given in Table III:

TABLE III

|  | E | F |
|---|---|---|
| EP copolymer (INTOLAN 36) | 100 | 100 |
| FEF (fast extrusion furnace) carbon black | 50 | 50 |
| Extending oil (Grange Alkane) (branched chain dodecylbenzene) | — | 60 |
| sulphur | 0.4 | 0.4 |
| dicumyl peroxide (Dicup 40 C) | 10.0 | 10.0 |
| % volume of olefin polymer | 76.7 | 48.0 |
| adhesion to polypropylene (%) | None | 100 rubber failure on strip-

TABLE III-continued

|   | E | F |
|---|---|---|
|   |   | ing |

Note: all values are parts by weight unless stated otherwise.

EXAMPLE IV

Rubber composition G of the formulation given below was vulcanized at 150° C for 60 mins and a sample was prepared and placed in a mould as described in Example I.

TABLE IV

|   | G |
|---|---|
| EPDM (ROYALENE 502) | 100 |
| FEF (fast extrusion furnace) carbon black | 105 |
| naphthenic oil | 60 |
| zinc oxide | 5 |
| sulphur | 2 |
| mercaptobenzthiazole | 1.5 |
| tetramethyl thiuram disulphide | 0.75 |
| tellurium diethyl dithiocarbamate | 0.75 |
| dipentamethylene thiuram tetrasulphide | 0.75 |
| % volume of olefin polymer | 47.1 |

Note: all values are parts by weight unless stated otherwise.

A crystalline polymer of propylene and ethylene in which the ethylene is a minor constituent at less than 5 mole percent and with a melt flow index of 3.0 (commercially available as Propathene GWM 101) was injected at 300° C into the mould containing the rubber sample. The mould temperature was 50° C. On stripping the vulcanizate from the propylene copolymer, rubber failure occurred.

EXAMPLE V

Rubber compositions H and I of the formulations below were vulcanized at 150° C for 60 minutes in a mould measuring 4.0 mm × 76.2 mm × 228.6 mm. Slabs measuring 4.0 mm × 76.2 mm × 101.6 mm were cut from the sheet and placed in turn in a mould measuring 9.5 mm × 76.2 mm × 101.6 mm. A crystalline block copolymer of propylene and ethylene containing approximately 80 mole percent of propylene (commercially available as Tenite 522VA) was injected at 300° C into the mould containing the rubber sample and maintained at a pressure of 94 MN/m² (meganewtons per square meter) for 15 seconds. The mould temperature was 50° C. The composite was allowed to cool for 75 seconds.

|   | H | I |
|---|---|---|
| EPDM (Royalene 502) | 100 | 100 |
| FEF (fast extrusion furnace) carbon black | 20 | 100 |
| naphthenic oil | 20 | 100 |
| zinc oxide | 5 | 5 |
| sulphur | 2 | 2 |
| mercaptobenzthiazole | 1.5 | 1.5 |
| tellurium diethyl dithiocarbamate | 0.75 | 0.75 |
| dipentamethylenethiuram tetrasulphide | 0.75 | 0.75 |
| tetramethylthiuram disulphide | 0.75 | 0.75 |
| % volume of olefin polymer | 79.0 | 42.9 |
| adhesion to ethylene/propylene copolymer (%) | None | 100 rubber failure on stripping |

Note: all parts are by weight unless stated othewise.

Having now described our invention what we claim is:

1. A method of producing a molded plastic-rubber composite comprising
   injection or transfer molding a substantially linear crystalline low pressure solution olefin polymer with a melt index or minimum flow rate of not less than 0.25 when measured according to the test conditions specified in ASTM D 1238-65T selected from the group consisting of polypropylene, high density polyethylene, copolymers of ethylene and propylene; copolymers of ethylene, propylene, and a minor amount of at least one other olefin monomer; copolymers of ethylene and a minor amount of at least one other olefin monomer other than propylene, and copolymers of propylene and a minor amount of at least one other olefin other than ethylene
   so that it is brought, in a molten state, into contact with a prevulcanized rubber composition, containing from 5 to 70 percent by volume of a prevulcanized rubbery olefin polymer selected from the group consisting of ethylene/propylene copolymers containing from 20 to 85 mole percent of units derived from ethylene and ethylene/alpha-olefin/-polyene terpolymers containing from 20 to 85 mole percent of units derived from ethylene and from 0.1 to 10 mole percent of units derived from said polyene, the remainder of the composition being comprised of ingredients normally used in compounding rubbery olefin polymers.

2. An injection or transfer-molded composite made by the method of claim 1.

3. A method according to claim 1 in which the prevulcanised rubber composition contains from 5 to 55 percent by volume of a rubbery olefin polymer.

4. The method of claim 1 in which said substantially linear crystalline low pressure solution olefin polymer is selected from the group consisting of ethylene/propylene/butene-1, ethylene/propylene/hexene-1, ethylene/butene-1, ethylene/hexene-1, propylene/butene-1 and propylene/hexene-1 polymers.

5. A method according to claim 1 in which the substantially linear crystalline low pressure solution olefin polymer contains a minor amount of units derived from a diene monomer.

6. A method according to claim 5 in which the diene monomer is butadiene.

* * * * *